United States Patent
Szeto

(10) Patent No.: US 9,898,048 B2
(45) Date of Patent: Feb. 20, 2018

(54) INTERCONNECTABLE ELECTRONIC DEVICE WITH MAGNETIC RAIL

(71) Applicant: NANOPORT TECHNOLOGY INC., Markham (CA)

(72) Inventor: Timothy Jing Yin Szeto, Markham (CA)

(73) Assignee: NANOPORT TECHNOLOGY INC., Markham, Ontario (CA)

( * ) Notice: Subject to any disclaimer, the term of this patent is extended or adjusted under 35 U.S.C. 154(b) by 35 days.

(21) Appl. No.: 15/002,027

(22) Filed: Jan. 20, 2016

(65) Prior Publication Data
US 2017/0205855 A1 Jul. 20, 2017

(51) Int. Cl.
*G06F 1/16* (2006.01)
*H04M 1/02* (2006.01)

(52) U.S. Cl.
CPC .......... *G06F 1/1656* (2013.01); *G06F 1/1624* (2013.01); *H04M 1/0216* (2013.01); *H04M 1/0237* (2013.01)

(58) Field of Classification Search
CPC ............ H01L 2924/00; H04M 1/0237; H04M 2250/12; H04M 1/0216; H04M 1/022; H04M 1/0214; H04M 1/0235; H04M 1/0239; H04M 2250/22; H04M 1/0247; G06F 1/1624; G06F 1/1616; G06F 1/1679; G06F 1/1656
See application file for complete search history.

(56) References Cited

U.S. PATENT DOCUMENTS

| | | | | |
|---|---|---|---|---|
| 2005/0059443 A1* | 3/2005 | Pan | ...................... | H04M 1/0237 455/575.4 |
| 2005/0136698 A1* | 6/2005 | Kwon | ................. | H04M 1/0237 439/38 |
| 2007/0297267 A1* | 12/2007 | Han | ..................... | H04M 1/0216 365/230.05 |
| 2008/0081505 A1* | 4/2008 | Ou | ........................ | G06F 1/1616 439/374 |
| 2008/0119250 A1* | 5/2008 | Cho | .................... | H04M 1/0237 455/575.4 |

(Continued)

FOREIGN PATENT DOCUMENTS

WO  2015/070321 A1  5/2015
WO  2015070321     5/2015

OTHER PUBLICATIONS

International Search Report and Written Opinion dated Apr. 25, 2017 in relation to PCT Application No. PCT/CA2017/050057, filed on Jan. 18, 2017.

*Primary Examiner* — Adam B Dravininkas

(57) ABSTRACT

An electronic device includes a plurality of magnetic guide rails proximate its surface. The electronic device may be interconnected to a second electronic device in a configuration in which the second electronic device is located at a pre-defined position relative to the electronic device. The plurality of magnetic guide rails in the electronic device interact with at least one magnetic element on the second electronic device to magnetically guide relative movement of the two electronic devices. As one electronic device is urged along a surface of the other toward the pre-defined position, the electronic devices are positioned in the configuration of the pre-defined position.

21 Claims, 20 Drawing Sheets

(56) References Cited

U.S. PATENT DOCUMENTS

| | | | |
|---|---|---|---|
| 2008/0125200 A1* | 5/2008 | Park | H04M 1/0237 455/575.4 |
| 2008/0259535 A1* | 10/2008 | Wu | H04M 1/0237 361/727 |
| 2010/0067833 A1* | 3/2010 | Jin | H04M 1/0237 384/8 |
| 2010/0197148 A1 | 8/2010 | Rudisill et al. | |
| 2013/0044501 A1 | 2/2013 | Rudisill et al. | |
| 2015/0141092 A1 | 5/2015 | Murauyou et al. | |

* cited by examiner

INTERCONNECTABLE ELECTRONIC DEVICE WITH MAGNETIC RAIL

TECHNICAL FIELD

This relates to electronic devices, and more particularly to electronic devices that are inter-connectable with other devices, and magnetic guide rails for guiding movement of electronic devices relative to one another.

BACKGROUND

Many electronic devices, including mobile electronic devices (e.g., smartphones, tablet computers, laptop computers) have the ability to connect with a variety of other devices (e.g., peripherals—in the form of display screens, touch screens, keyboards, batteries, speakers, sensors, cameras, communication devices) that come in various form factors and sizes. Peripheral devices may connect mechanically and/or electrically with the electronic device in a pre-defined configuration and position.

Often, accurate relative physical placement of the devices is not required, or is achieved by precise alignment of mechanical elements/connectors. For example, complementary slots, grooves and tabs and other connectors are often used to mechanically link electronic devices in pre-defined configurations.

However, precise alignment of mechanical connectors on such co-operating electronic device may often be cumbersome, if not difficult and often results in user frustration.

Accordingly, there is need for an improved interconnect between electronic devices.

SUMMARY

According to an aspect, there is provided an electronic device that may be interconnected to a second electronic device in a configuration in which the second electronic device is located at a pre-defined position relative to the electronic device. The electronic device includes a plurality of magnetic guide rails proximate a surface. The plurality of magnetic guide rails interact with at least one magnetic element on the second electronic device to magnetically guide relative movement of the electronic device and the second electronic device to position the electronic device and the second electronic device in the configuration as at least one of the electronic device and second electronic device is urged along a surface of the electronic device toward the pre-defined position.

According to another aspect, there is provided a method of operating electronic devices. The method includes providing a first electronic device that has a plurality of magnetic guide rails proximate a surface, and urging at least one of the first electronic device and a second electronic device along the surface of the first electronic device toward a configuration in which the second electronic device is located at a pre-defined interconnected position relative to the first electronic device. The plurality of magnetic guide rails interact with at least one magnetic element on the second electronic device to magnetically guide relative movement of the first electronic device and the second electronic device toward the configuration.

Other features will become apparent from the drawings in conjunction with the following description.

BRIEF DESCRIPTION OF THE DRAWINGS

In the figures which illustrate example embodiments.

DETAILED DESCRIPTION

Figure 1A:
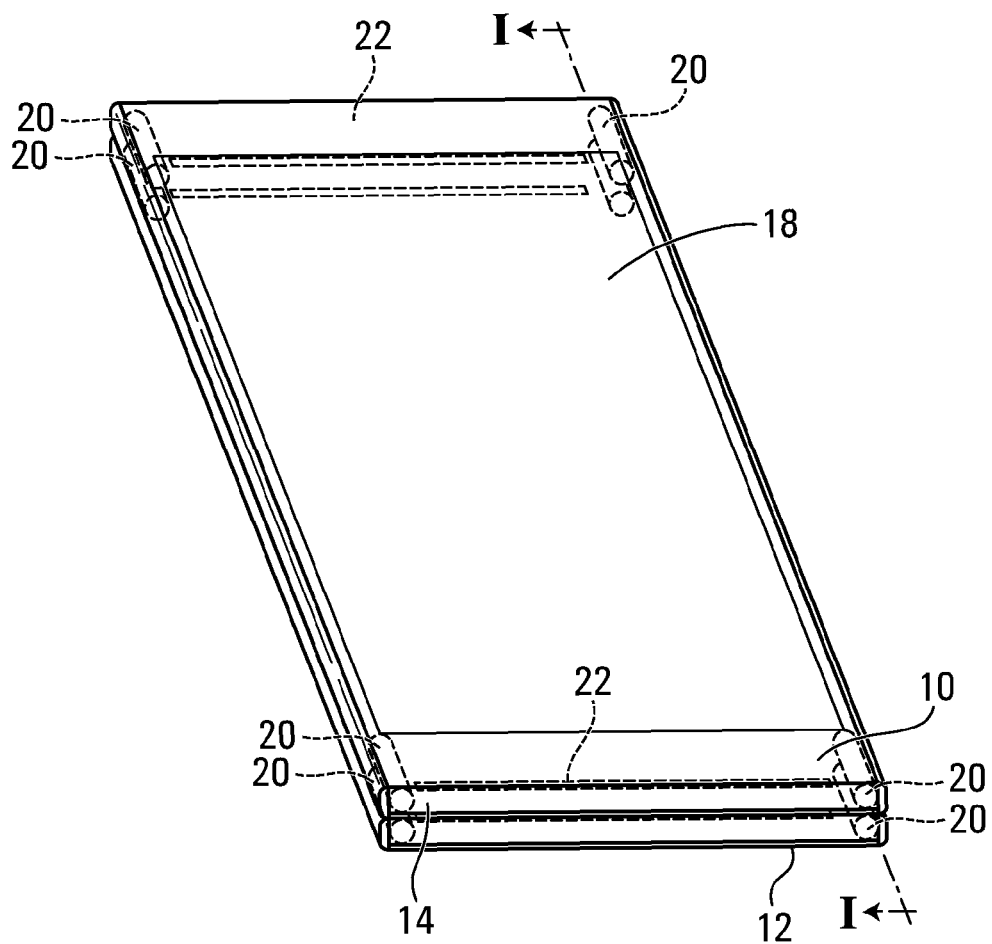
FIGS. 1A, 1B and 1C are perspective views two electronic devices in three respective relative configurations, exemplary of an embodiment.
Figure 1B:
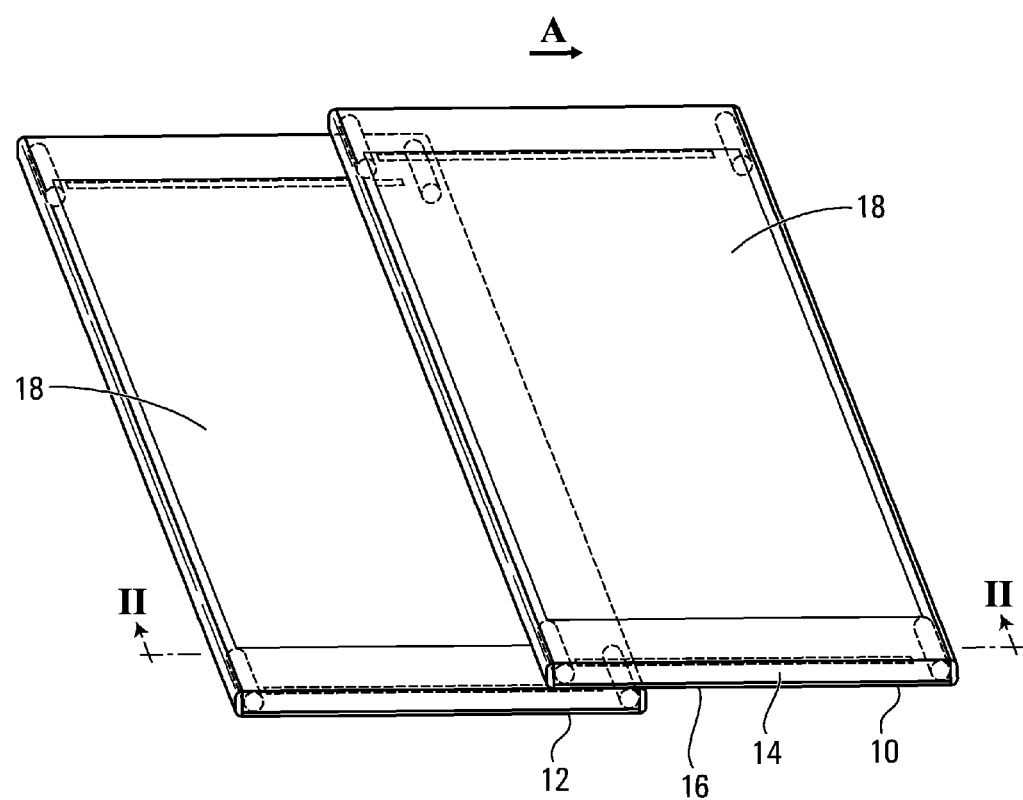
Figure 1C:
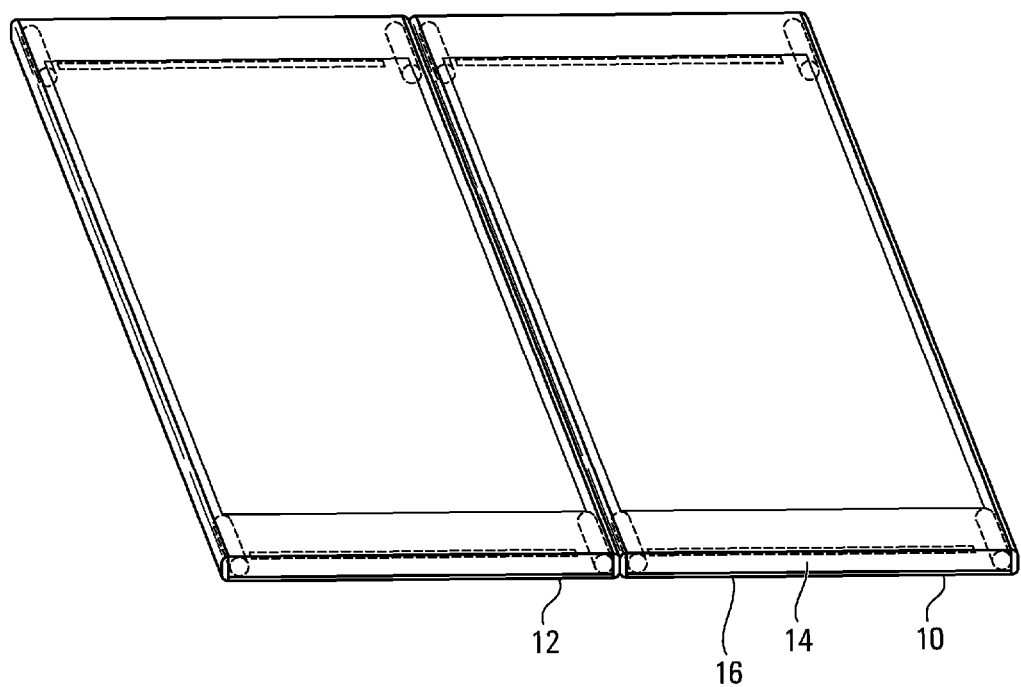

FIGS. 1A, 1B and 1C are perspective views of an electronic device 10 and a second electronic device 12. Electronic device 10 is illustrated in three different configurations, one configuration depicted respectively in FIGS. 1A, 1B and 1C, exemplary of an embodiment.

FIG. 1A illustrates a first configuration of electronic device 10 relative to and interconnected with second electronic device 12. In the configuration of FIG. 1A, electronic device 10 is stacked atop second electronic device 12. FIG. 1B illustrates a second configuration of electronic devices 10, 12 in use, with electronic device 10 being guided along a surface of second electronic device 12. FIG. 1C illustrates a third configuration of electronic devices 10, 12 arranged side by side.

As illustrated, each of electronic devices 10, 12 is housed in a housing 14 defined by external surfaces 16 and may include, for example, a display screen 18. In the depicted embodiment, housing 14 is generally rectangular. Housing 14 may be formed as a unitary body, or may be formed of multiple component/pieces. For example, housing 14 may include a separate rear cover. Other geometries are, of course, possible. For reasons that will become apparent, housing 14 is typically formed of a material that is not magnetic. Housing 14 may be formed of a material such as plastic, rubber, aluminium, glass, or generally any non-ferromagnetic material. Device electronics, including, for example, a processor, display, power supply (e.g. battery) may all be housed within housing 14.

Each of electronic devices 10, 12 may, for example, be an electronic device that interfaces with another. Electronic devices 10, 12 may provide complementary functions to each other, as for example as disclosed in PCT/CA2014/000803, the contents of which are hereby incorporated by reference. For example, each electronic device 10, 12 may be a mobile electronic device (e.g., smartphone, tablet computer, laptop computer), or electronic device 10 may be a mobile computing device and second electronic device 12 may be a peripheral device (e.g., display screen, touch screen, keyboard, battery, speaker, sensor, camera, communication device, storage device, or the like) that may come in various form factors and sizes.

As illustrated in FIGS. 1A, 1B and 1C, both electronic devices 10, 12 may include display screens. Other types of electronic devices having feature of electronic devices 10, 12 may be contemplated that benefit from interconnection and possible interoperation.

Each of electronic devices 10, 12 includes a plurality of magnetic elements, for example, in the form of connectors 20. In the depicted embodiment, connectors 20 are proximate the corners of electronic devices 10, 12. They may however, be located elsewhere on device 10, 12. Connectors 20 may provide an electrical and/or physical connection between electronic device 10 and second electronic device 12.

In particular, connectors 20 may be magnetic and may be magnetically attracted to each other to physically couple devices 10 and 12 to each other, for example as detailed in PCT/CA2014/000803. In an embodiment, each connector 20 includes one or more permanent magnets to provide mechanical fastening to another connector 20 or another magnetic material. Additionally, and optionally, connectors 20 may provide electrical interconnection between devices 10 and 12.

Figure 3A:
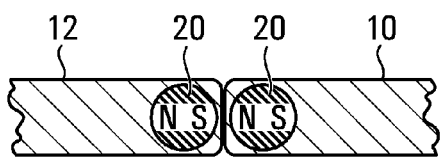
FIGS. 3A and 3B are side views of a portion of the two electronic devices of FIGS. 1A, 1B and 1C illustrating example connectors in two possible configurations.
Figure 3B:
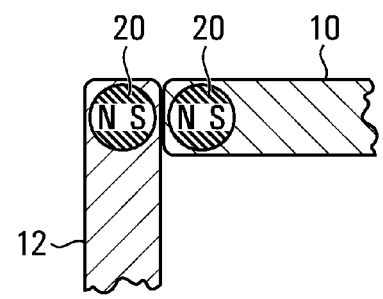

In some embodiments, connectors 20 may be cylindrical in shape with a diametrically-magnetized magnet having hemispherical poles such that one half of the cylinder is a north pole and the other a south pole, and the magnet in each connector 20 is free to rotate about a central axis to facilitate magnetic engagement between the connectors 20. In particular, the magnets in one or more of connectors 20 may rotate to be oriented such that the north and south poles of adjacent magnets are aligned, as viewed in FIGS. 3A and 3B. In some embodiments, once connectors 20 are magnetically engaged, an electrical connection may be formed through connectors 20 to provide data and/or power paths. For example, connectors 20 may be the physical and electrical interconnect for a serial communications port—that may for example, be electrically compatible with the Universal Serial Bus (USB) protocol, as detailed in PCT/CA2014/000803. To that end, each of devices 10, 12 may include device electronics interconnected with connectors 20 to allow suitable electrical interconnection and communication by way of connectors 20.

In other embodiments, connectors 20 may be configured with one or more radially-magnetized magnets such that one circular planar surface is a north pole and the other a south pole.

In alternative embodiments, connectors 20 may have other magnetic properties, for example, they may be made of ferromagnetic, paramagnetic or diamagnetic materials.

Embodiments showing example placements of connectors 20 in second electronic device 12 are shown in FIGS. 4A, 4B, 4C and 4D in a partial perspective view.

Figure 4A:
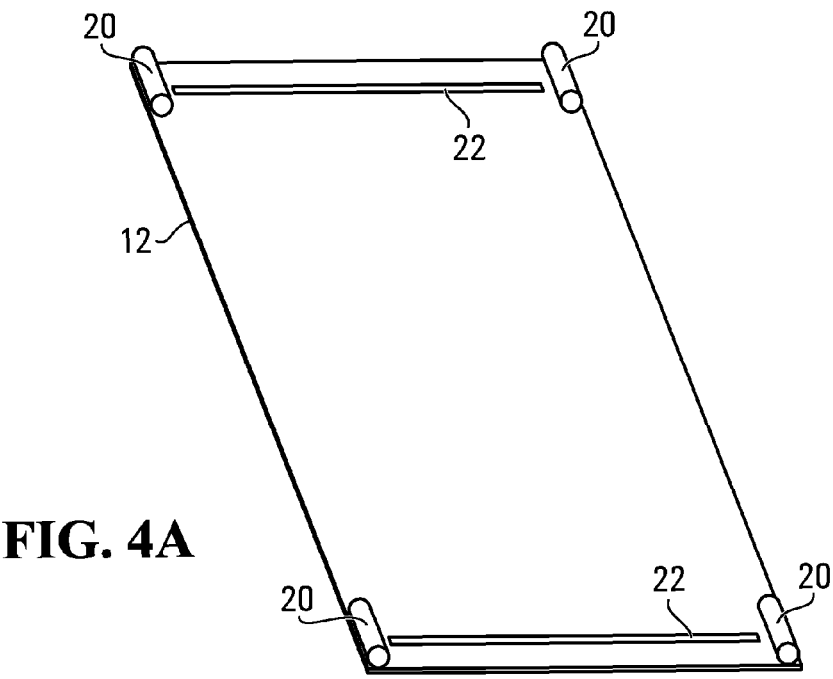
FIGS. 4A, 4B, 4C and 4D are partial perspective views showing locations of connectors on an electronic device, exemplary of embodiments.
Figure 4B:
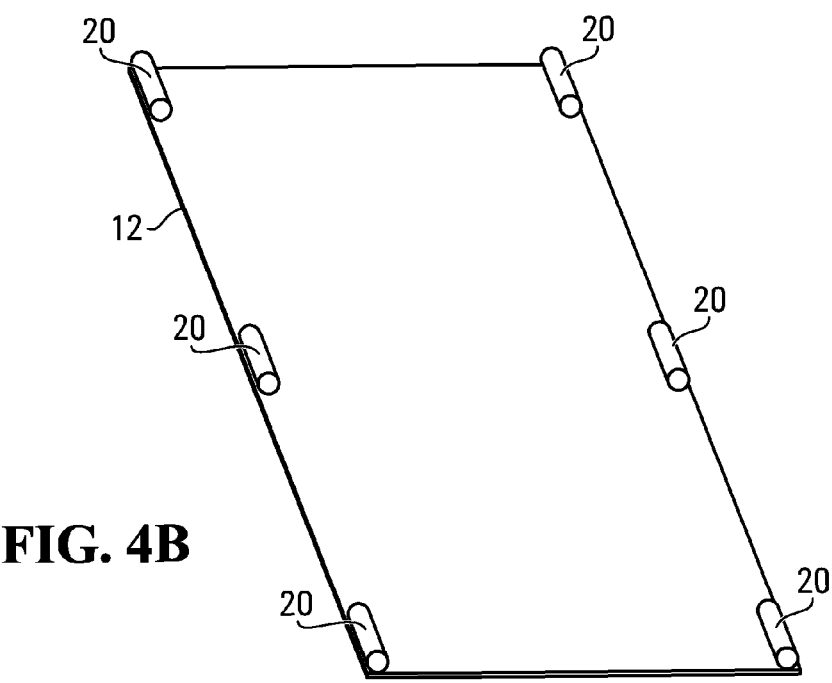
Figure 5A:
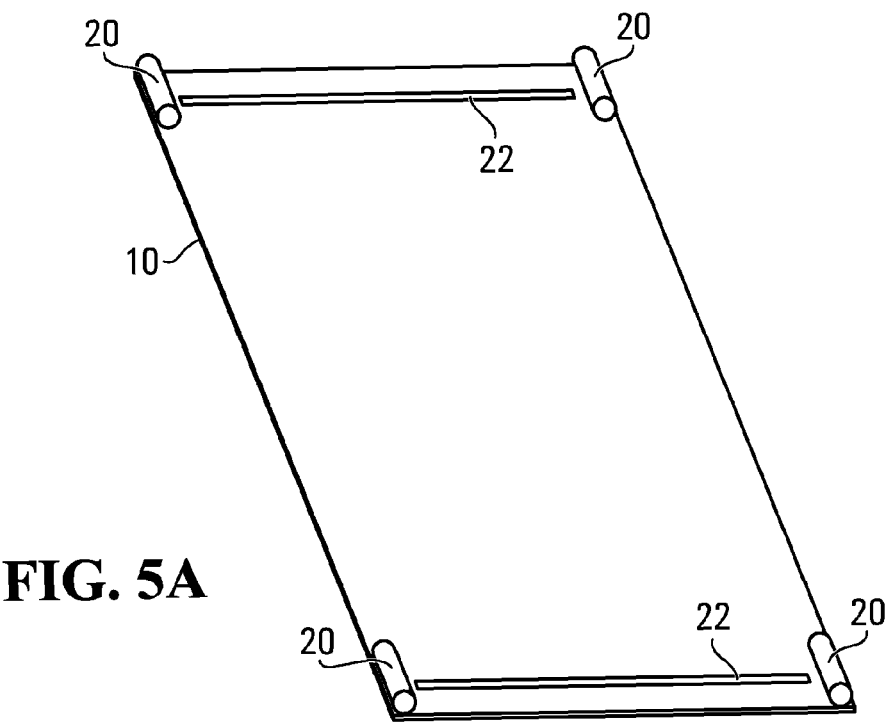
FIGS. 5A, 5B, 5C, 5D, 5E and 5F are partial perspective views illustrating example rails on an electronic device used to connect or align another electronic device, exemplary of embodiments.

An example physical configuration of second electronic device 12 in the embodiment of FIGS. 1A, 1B and 1C is illustrated in FIG. 4A, and an example physical configuration of electronic device 10 in the embodiment of FIGS. 1A, 1B and 1C is illustrated in FIG. 5A.

As illustrated in FIG. 5A, electronic devices 10 further includes magnetic guide rails 22. Magnetic guide rails 22 are provided within electronic device 10 to guide movement of second electronic device 12 along paths defined by magnetic guide rails 22 with reference to connectors 20 in second electronic device 12. In an embodiment, magnetic guide rails 22 extend substantially between two connectors 20. Magnetic guide rails 22 may extend up to a point at which they physically contact connectors 20, or magnetic guide rails 22 may terminate at a point proximate connectors 20, as illustrated in FIG. 5A.

Magnetic guide rails 22 in second electronic device 12 can perform a similar function with reference to another electronic device, for example if the positions of electronic device 10 and second electronic device 12 were reversed. To that end, each of devices 10, 12 may include magnetic guide rails 22 to guide movement of another electronic device along paths defined by magnetic guide rails 22 with reference to a connector 20 in another electronic device.

In some embodiments, magnetic guide rails 22 are "magnetic" in that they are formed from an unmagnetized ferromagnetic material, such as iron, cobalt or nickel or other ferrous material (e.g., steel, other alloys) or other ferromagnetic material known to a person skilled in the art having a high susceptibility to magnetization. Such ferromagnetic material is already magnetic on an atomic level—within a magnetic domain (group of atoms) the magnetization is uniform, however, the magnetic domains are not aligned with each other. An externally imposed magnetic field applied to an unmagnetized ferromagnetic material can cause the magnetic domains in the material to line up with each other, and the ferromagnetic material is said to be magnetized. The magnetic field of the magnetized ferromagnetic material may be lost with time as the magnetic domains return to their original unaligned configuration, and this is therefore a temporary magnet.

As such, magnetic guide rails 22 may be magnetized in the presence of a magnetic field, for example as exerted by a permanent magnet such as the permanent magnets present in connectors 20, and become magnetically attracted to engage with said permanent magnet, and thus connectors 20.

Alternatively, guide rails 22 may be magnetized in the presence of an electromagnetic field, as further detailed below.

Electronic device 10, when urged along an external surface of housing 14 of second electronic device 12, by applying a force on electronic device 10 over the external surface of second electronic device 12, moves across the external surface of second electronic device 12 along a defined path to a pre-defined position, for example, as shown in FIG. 1C. The pre-defined position may, for example, be the rest position of electronic device 10 on second electronic device 12, to allow interoperation of devices 10, 12. In an embodiment, the rest position of electronic device 10 on second electronic device 12 results in mechanical (e.g. magnetic) and electrical interconnection of connectors 20 of the devices 10, 12, and interoperation by establishing a serial (e.g. USB) bus.

In the depicted embodiment, magnetic guide rails 22 are formed just beneath the rear external surface 16 of housing 14 in electronic device 10. Magnetic guide rails 22 may, for example, be mounted to housing 14, to a printed circuit board contained within housing 14, or on another substrate or sub-frame contained within housing 14. In an exemplary embodiment, magnetic guide rails 22 may be located 0.1 mm to 1 mm or several mm beneath the external rear surface 16 of housing 14 of electronic device 10. The locations of magnetic guide rails 22 under external surface 16 may be a distance corresponding to the thickness of a housing 14 of device 10. In an exemplary embodiment, magnetic guide rails 22 may be approximately 0.3 mm thick and 2 mm wide. The width of magnetic guide rails 22 may generally correspond to the width of connectors 20 on second electronic device 12. In some embodiments, the width of magnetic guide rails 22 may be up to +/50% of the width of connectors 20. In some embodiments, the width of magnetic guide rails 22 may be up to +/−100% or more of the width of connectors 20. Extending the width of magnetic guide rails 22 may provide some tolerance for position of devices 10, 12 relative to one another. The thickness of magnetic guide rails 22 may be chosen to provide sufficient stiffness/strength of magnetic guide rails 22 and a sufficient degree of magnetic attraction with connectors 20 on second electronic device 12. The greater the distance magnetic guide rails 22 are positioned from the external surface 16, the thicker the magnetic guide rails 22 may need to be.

Figure 2:
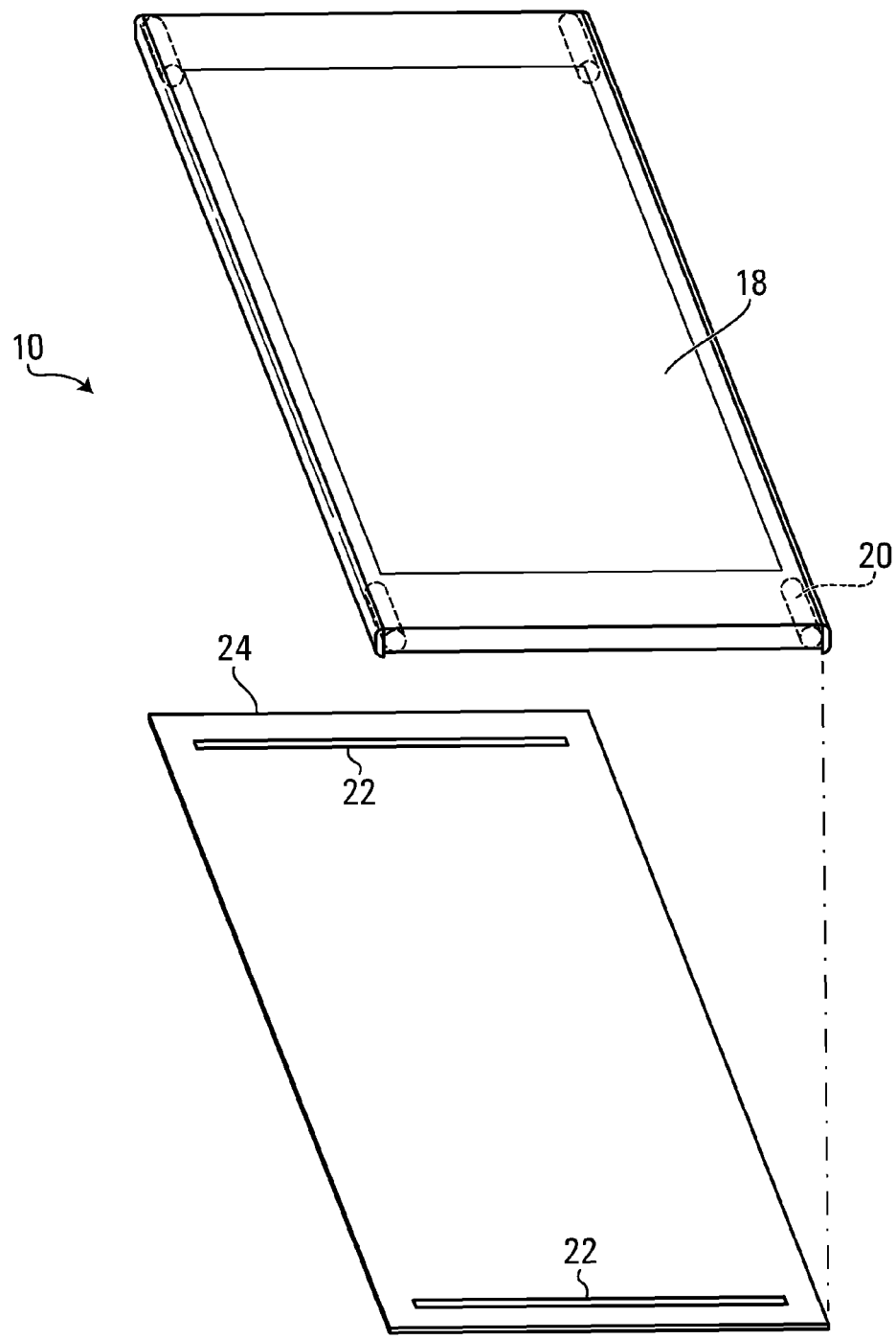
FIG. 2 is an exploded view of an electronic device of FIG. 1A as a smartphone, exemplary of an embodiment.

Magnetic guide rails 22 have been described and illustrated in an electronic device, such as electronic device 10. In a particular embodiment, magnetic guide rails 22 as described herein can be placed in an electronic device such as a smart phone. FIG. 2 is an exploded perspective view of a smartphone, exemplary of an embodiment of electronic device 10. FIG. 2 illustrates an example of the embodiment of an electronic device 10 illustrated in FIGS. 1A, 1B and 1C implemented in a smart phone with ferromagnetic magnetic guide rails 22 and connectors 20, magnetic guide rails 22 on an interior rear surface of a non-ferrous back plate 24, part of housing 14 of the smart phone.

Figure 4C:
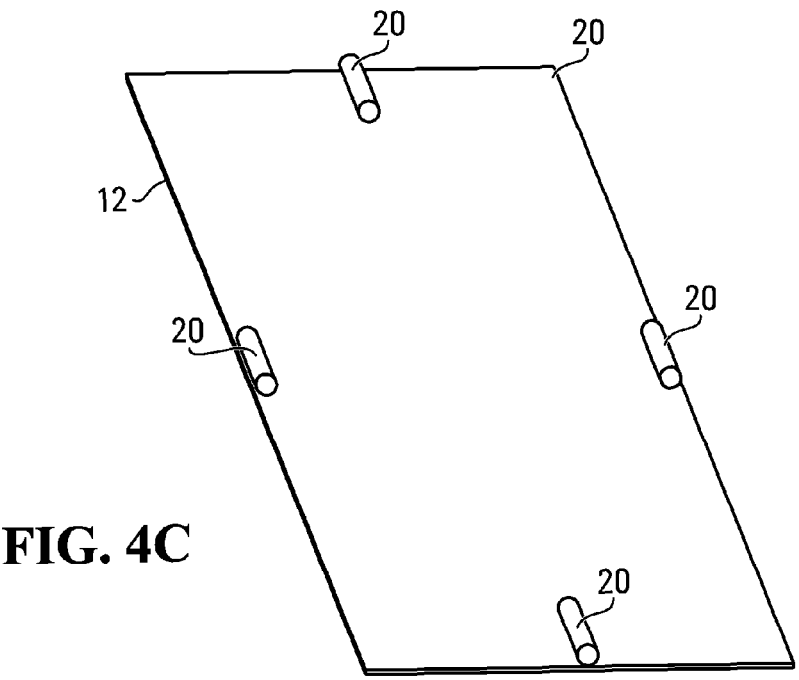
Figure 4D:
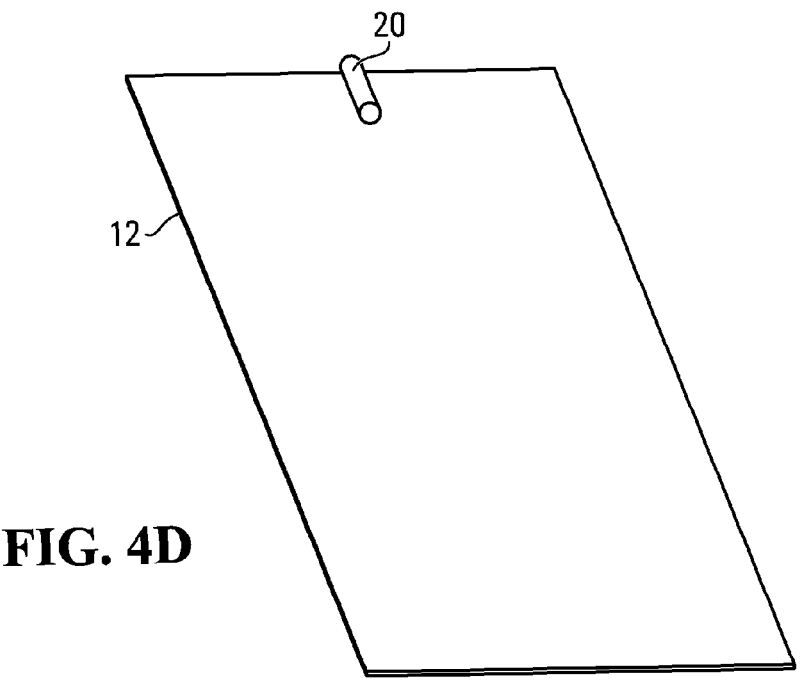
Figure 5B:
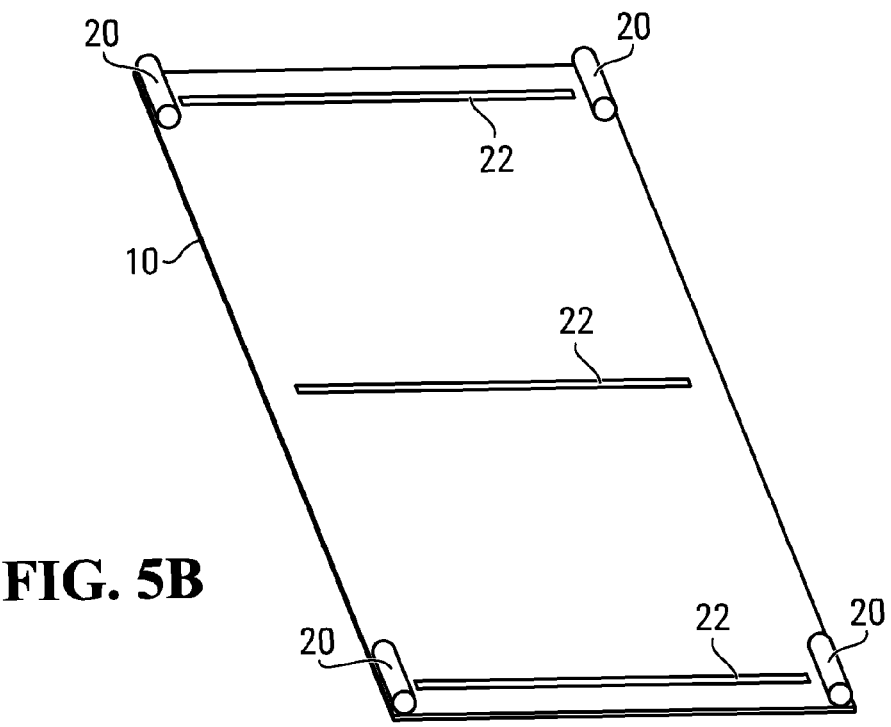
Figure 5C:
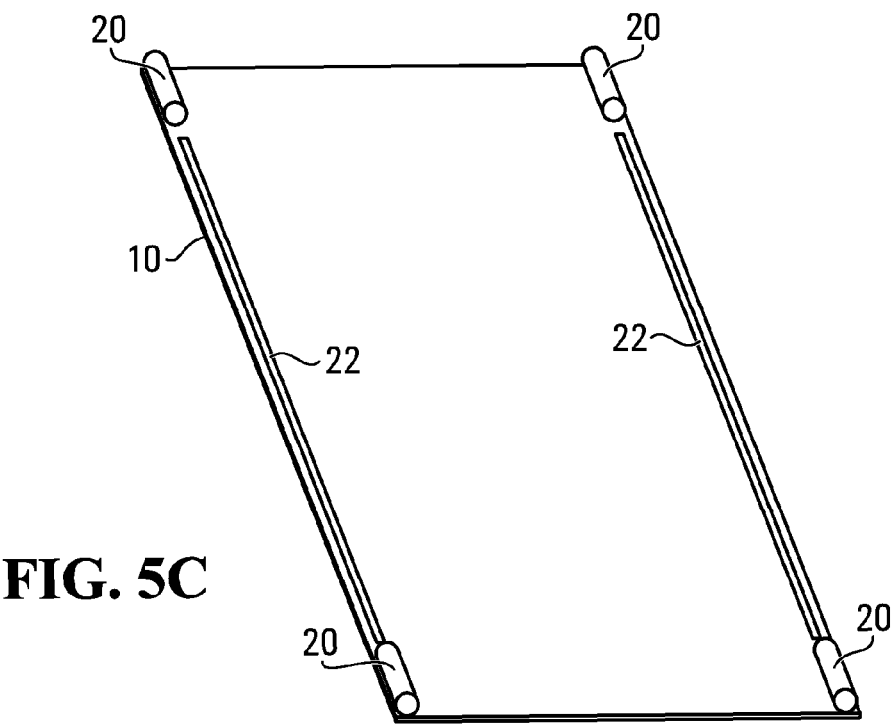
Figure 5D:
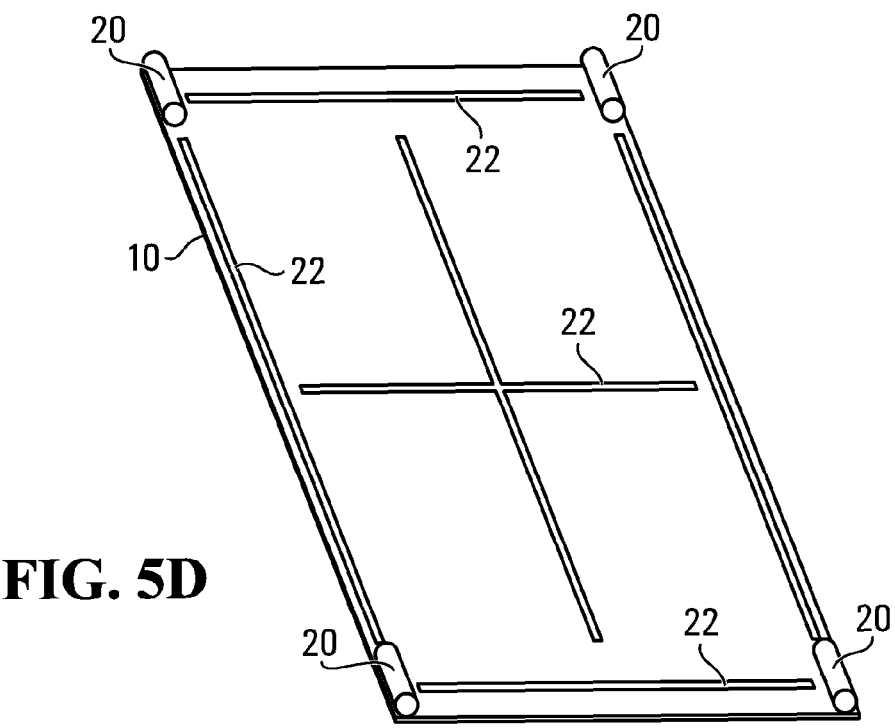
Figure 5E:
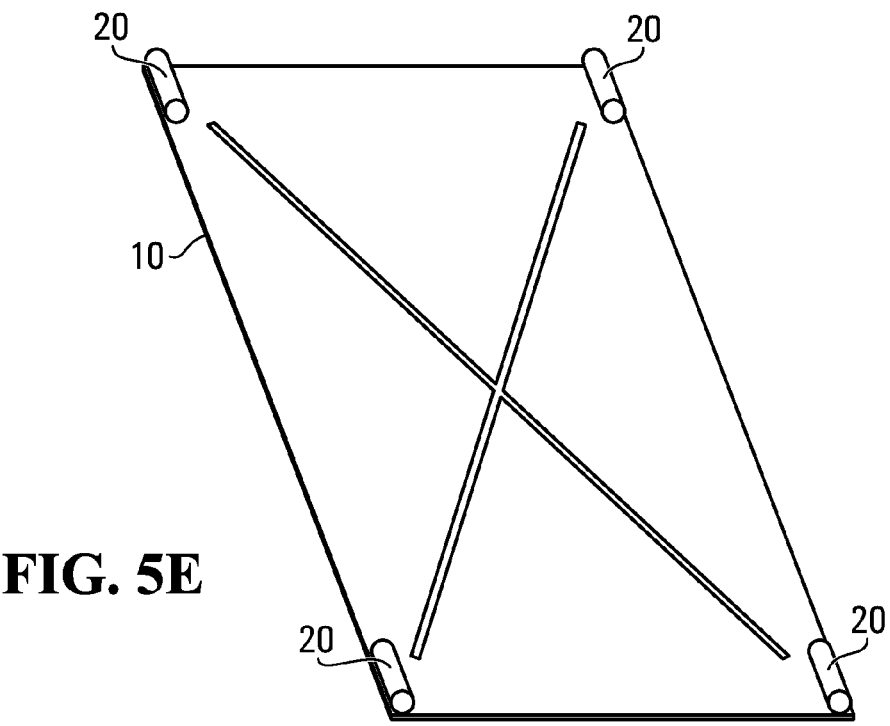
Figure 5F:
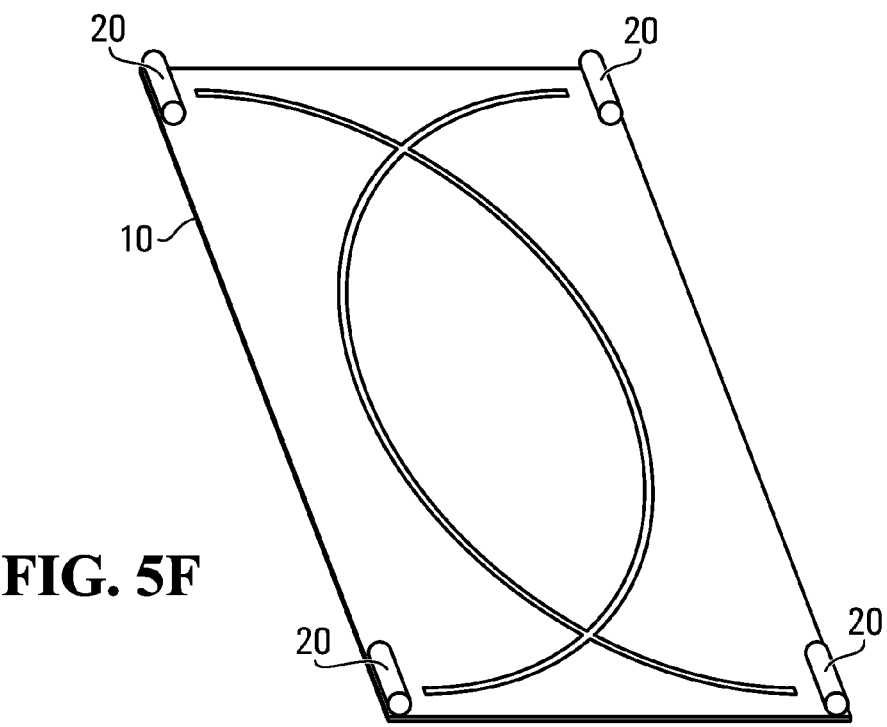

Alternative embodiments for placement of the magnetic guide rails 22, for example in electronic device 10, are shown in FIGS. 5B, 5C, 5D, 5E and 5F, illustrating a partial perspective view. As shown in FIG. 5B, magnetic guide rails 22 may extend horizontally within the plane of surface 16 to guide movement of electronic device 10 horizontally in this plane. Magnetic guide rails 22 may also extend vertically, as shown in FIG. 4C, or both horizontally and vertically, as shown in FIG. 5D. Magnetic guide rails 22 may extend diagonally, as shown in FIG. 5E, which may, for example, guide movement of a smaller form-factor electronic device 10 from a top-left quadrant of second electronic device 12 to a bottom-right quadrant of second electronic device 12. Magnetic guide rails 22 may also be curved, as shown in FIG. 5F, to guide rotation of electronic device 10. As will thus be appreciated, magnetic guide rails 22 may constrain relative movement of electronic device 10 and second electronic device 12 in the plane of surface 16 of second electronic device 12. Effectively any two-dimensional path in this plane and on surface 16 may defined by magnetic guide rails 22 with reference to a connector 20 or other magnetic point.

Figure 6A:
FIGS. 6A, 6C and 6E are cross-section views of magnetic guide rails, exemplary of embodiments.
Figure 6B:
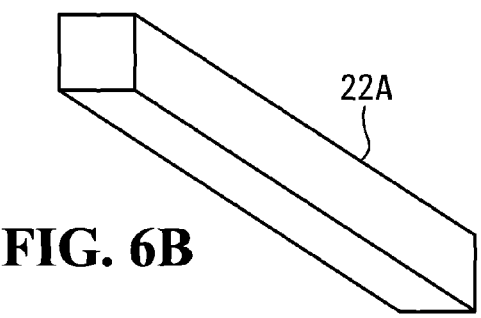
FIGS. 6B, 6D and 6F are perspective views of the magnetic guide rails of FIGS. 6A, 6C and 6E, exemplary of embodiments.
Figure 6C:
Figure 6D:
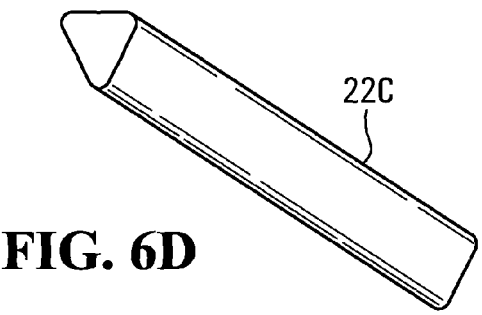
Figure 6E:
Figure 6F:
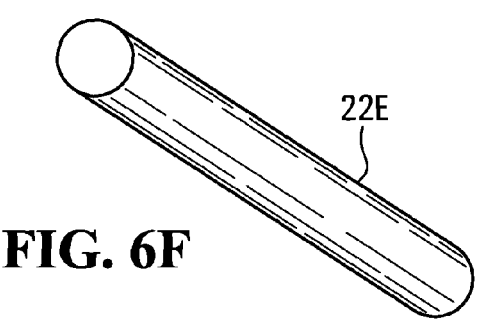

Magnetic guide rails 22 can take many physical configurations and geometries, including for example, those shown as magnetic guide rails 22A, 22C and 22E in FIGS. 6A, 6C and 6E. FIGS. 6B, 6D and 6F illustrate perspective view of magnetic guide rails 22A, 22C and 22E of FIGS. 6A, 6C and 6E, respectively. As illustrated, magnetic guide rails 22A may have a generally rectangular in cross-section (shown in FIGS. 6A, 6B). Alternatively, as shown in FIGS. 6C, 6D, magnetic guide rails 22C can have a taper to provide an apex facing surface 16 of electronic device 10, namely, facing second electronic device 12. This taper may shape the magnetic field exerted on magnetic guide rails 22 to concentrate the magnetic attractive force between a connector 20 in second electronic device 12 and magnetic guide rail 22 at an apex of the magnetic guide rail 22, extending in a line along magnetic guide rail 22. In another embodiment, magnetic guide rails 22E may have a generally rounded (e.g. circular or elliptical) cross-section as shown in FIGS. 6E, 6F. Other cross-sections will be apparent to those of ordinary skill.

In operation, permanent magnets in connectors 20 of second electronic device 12 attract magnetic guide rails 22 in electronic device 10. The magnetic force exerted by connectors 20 may thus magnetically guide magnetic guide rails 22 of electronic device 10, by the attraction of connectors 20 of second electronic device 12 to the surface of housing 14. As the surface of housing 14 of electronic device 10 is moved within the contact plane between device 10 and 12, connectors 20 of second electronic device 12 restrain movement of electronic device 10 along a path defined by magnetic guide rails 22 of electronic device 10 as electronic device 10 is urged along external surface 16 in the direction of arrow A as shown in FIG. 1B generally toward a pre-defined position, for example, where electronic devices 10, 12 are arranged side by side as shown in FIG. 1C.

In some embodiments, connectors 20 can be relatively imperceptible to a user, for example, without a visual target such as a socket. In such an embodiment, connectors 20 help magnetic guide rails 22 move into a pre-defined position by feel rather than a visual landmarking. In alternative embodiments, any other magnetic element of second electronic device 12 may be configured to attract or interact with the magnetic guide rails 22 of electronic device 10. For example, second electronic device 12 may include a magnetic nib, protrusion, physical connector or the like used to engage magnetic guide rails 22 of electronic device 10.

Figure 7:
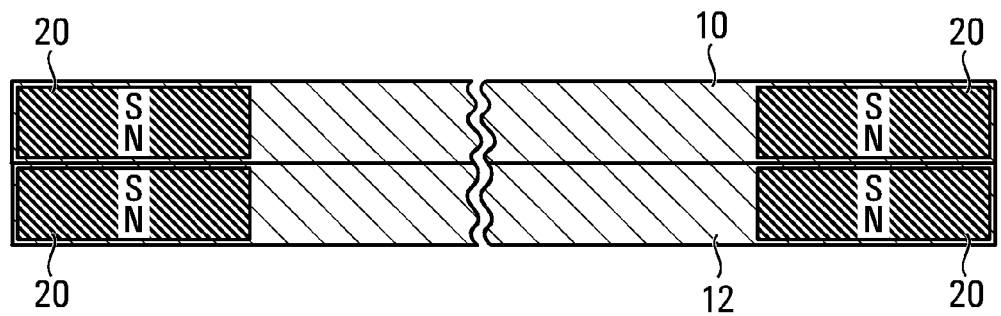
FIG. 7 is a side view of interconnected electronic devices of FIG. 1A, from a view I.
Figure 8:
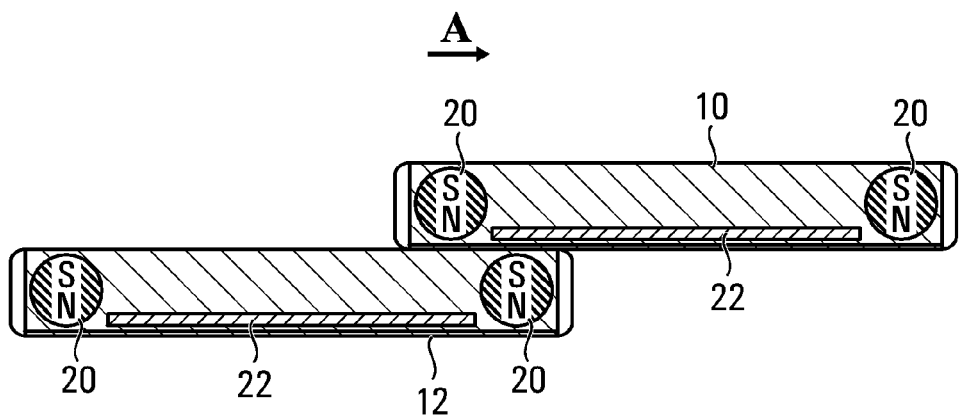
FIG. 8 is a front view of the electronic devices of FIG. 1B, from a view II.
Figure 9:
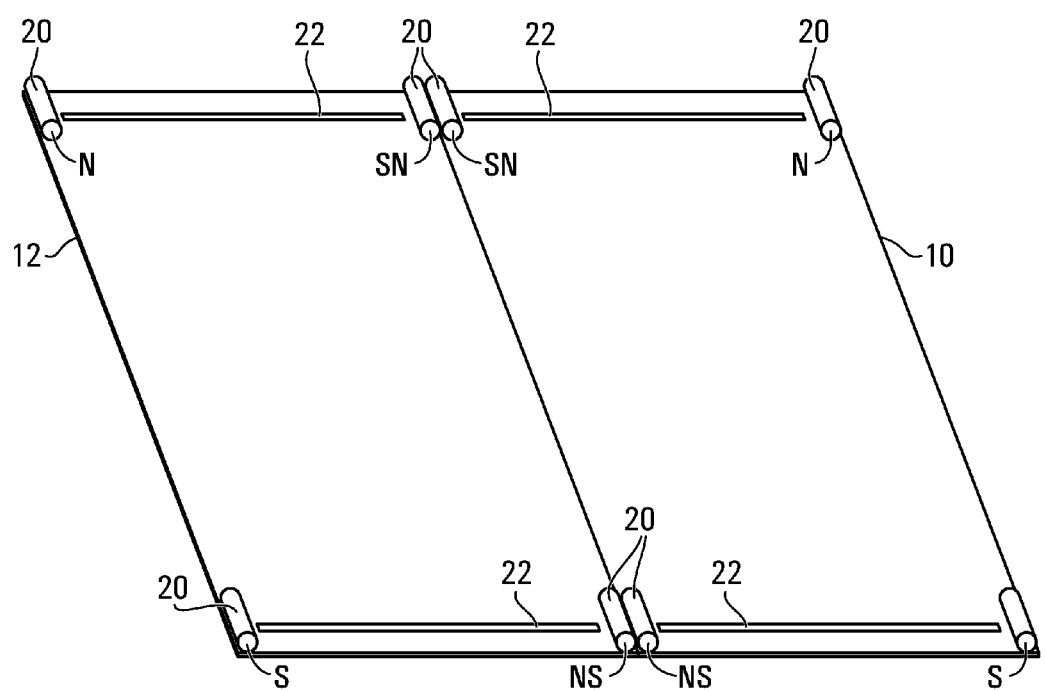
FIG. 9 is a top view of the electronic device of FIG. 1C.

In any event, magnetic guide rails 22 define a desired guide path for electronic device 10 relative to second electronic device 12. FIGS. 7, 8 and 9 illustrate the interaction of magnetic guide rails 22 of electronic device 10 with connectors 20 in second electronic device 12, as contemplated in the embodiment illustrated in FIGS. 1A, 1B and 1C. FIG. 7 is a side view of a portion of electronic device 10 and second electronic device 12 of FIG. 1A, from view I. FIG. 8 is a front view of a portion of electronic device 10 and second electronic device 12 of FIG. 1B, from view II. FIG. 9 is a top view of a portion of electronic device 10 and second electronic device 12 of FIG. 1C.

As shown in FIG. 7, a side view of a portion of electronic device 10 and second electronic device 12 of FIG. 1A from view I, connectors 20 in electronic device 10 and connectors 20 in second electronic device 12 are attracted to each other when electronic device 10 is stacked atop second electronic device 12.

In use, electronic device 10 is urged along the second electronic device 12, as seen in FIG. 8, schematically depicting a front view of a portion of the electronic device and second electronic device of FIG. 1B, from view II. As urged from left to right, connectors 20 in second electronic device 12 guide electronic device 10 along a path formed by magnetic guide rails 22 of electronic device 10 with reference to connectors 20 in second electronic device 12. Magnetic rails 22 are oriented close to the rear external surface 16 of electronic device 10, attracted by connector 20 in second electronic device 12 whose south pole extends towards electronic device 10.

FIG. 9 is a top view of a portion of electronic device 10 and second electronic device 12 of FIG. 1C. After being guided along magnetic rail guides 22, electronic device 10 is now in a pre-defined position relative to second electronic device 12. The pre-defined position may be a desired rest position of electronic device 10 relative to, or on second electronic device 12. In an embodiment, connectors 20 of second electronic device 12 may engage connectors 20 of electronic device 10 in this rest position. As such, electronic device 10 may be pulled into its pre-defined position by connectors 20 of second electronic device 12.

Figure 10A:
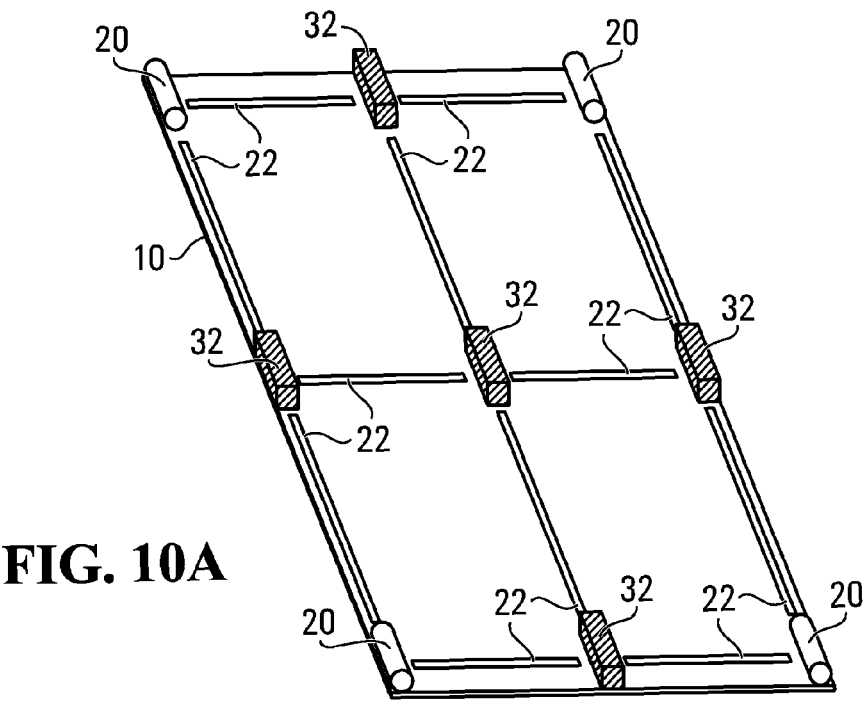
FIGS. 10A and 10B are partial perspective views illustrating example rails, magnetic pads, and connectors on an electronic device, exemplary of embodiments.
Figure 10B:
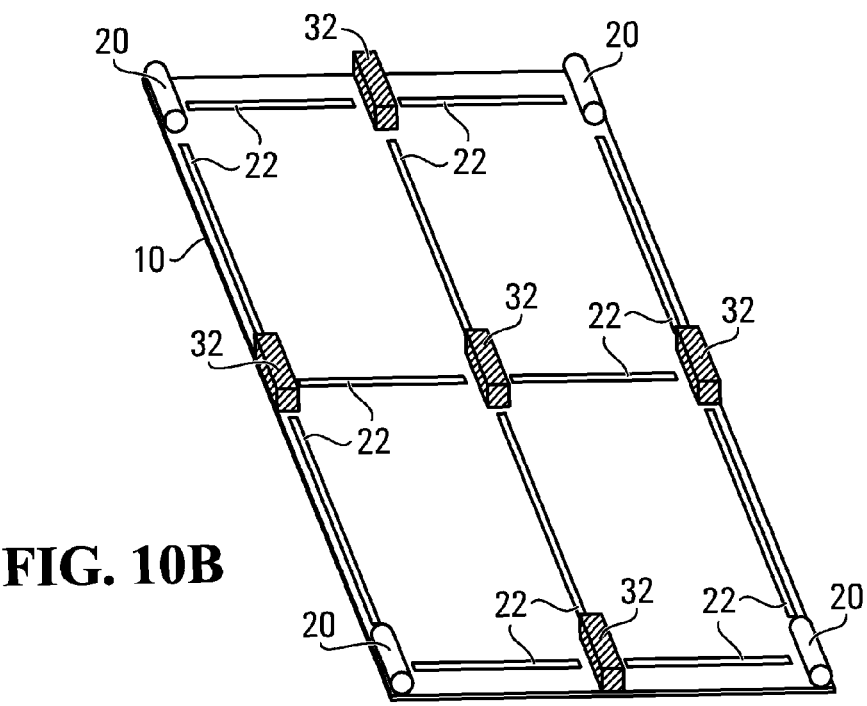

Magnetic guide rails 22 in electronic device 10 may also be used in conjunction with magnetic pads 32. FIGS. 10A and 10B are partial perspective views depicting locations of magnetic guide rails 22, magnetic pads 32, and connectors 20 on an electronic device 10, exemplary of two possible embodiments.

In some embodiments, magnetic pads 32 on electronic device 10 may align with connectors 20 on second electronic device 12. Magnetic pads 32 may also be used as magnetic anchor points between devices 10, 12.

In some embodiments, magnetic pads 32 are made of a ferromagnetic material, for example the same material as magnetic rails 22. Magnetic pads 32 may be attracted to the permanent magnets in connectors 20. Magnetic pads 32 may be in the shape of a rectangular prism, as shown in FIG. 10A, or may be cylindrical. Magnetic pads 32 may have a thickness of several millimeters. In some embodiments, magnetic pads 32 may be of the same thickness as magnetic guide rails 22, for example 0.3 mm, or may be of a different thickness and may have a thickness up to the thickness of the electronic device 10. Thicker magnetic pads 32 may provide greater magnetic attraction for the connectors 20 of the second electronic device 12, and thus may serve as a stronger anchor points.

When magnetic pads 32 are in proximity to connectors 20, and therefore magnetic pads 32 are magnetized by the permanent magnets in connectors 20, the magnetic pads 32 may serve to draw connectors 20 into proper position and alignment. Magnetic pads 32 may provide attachment points for connectors 20, and position electronic device 10 relative to second electronic device 12 in which connectors 20 are connected to magnetic pads 32 and not to other connectors 20.

Figure 11A:
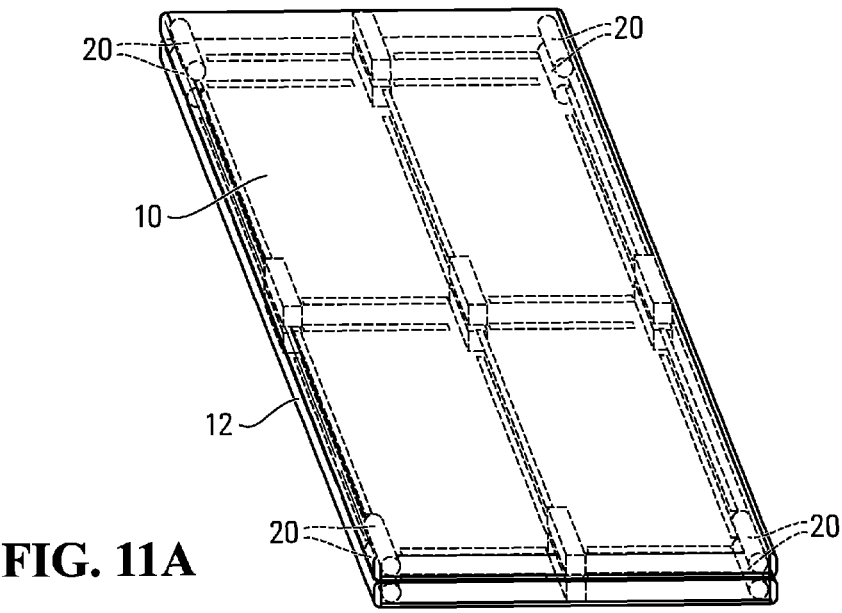
FIG. 11A is a perspective view of an electronic device interconnected with a second electronic device in a first configuration, exemplary of an embodiment.
Figure 11B:
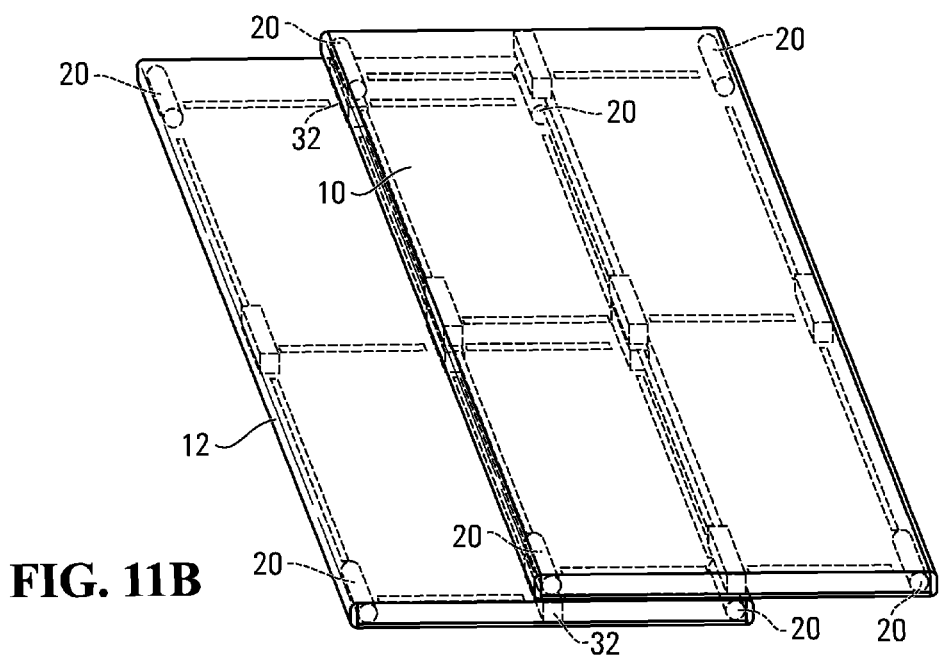
FIG. 11B is a perspective view of the electronic device of FIG. 11A interconnected with the second electronic device of FIG. 11A in a second configuration, exemplary of an embodiment.

FIGS. 11A and 11B illustrate the configuration of magnetic pads 32 and magnetic guide rails 22 as shown in FIG. 10A, implemented in both electronic device 10 and second electronic device 12. In the arrangement shown in FIG. 11A electronic device 10 and second electronic device 12 are stacked. Four connectors 20 in electronic device 10 are connected to four connectors 20 in second electronic device 12.

When urged, electronic device 10 may slide to the right in the direction of arrow B, as guided by magnetic guide rails 22 in electronic device 10, and come to rest as shown in FIG. 11B. In the position shown in FIG. 11B, the left-side connectors 20 in electronic device 10 are anchored to magnetic pads 32 located at the centre-line of second electronic device 12, and no connectors 20 are connected to each other as between electronic device 10 and second electronic device 12.

The functionality of electronic device 10 and second electronic device 12 in FIGS. 11A and 11B may change depending on their relative pose. For example, in FIG. 11A, second electronic device 12 could be in a sleep state or merely providing power to electronic device 10. However, when electronic device 10 is moved to expose part of the second electronic device 12, as shown in FIG. 11B, second electronic device 12 may present a graphical touch-screen display to provide an on-screen keyboard for electronic device 10.

Figure 12A:
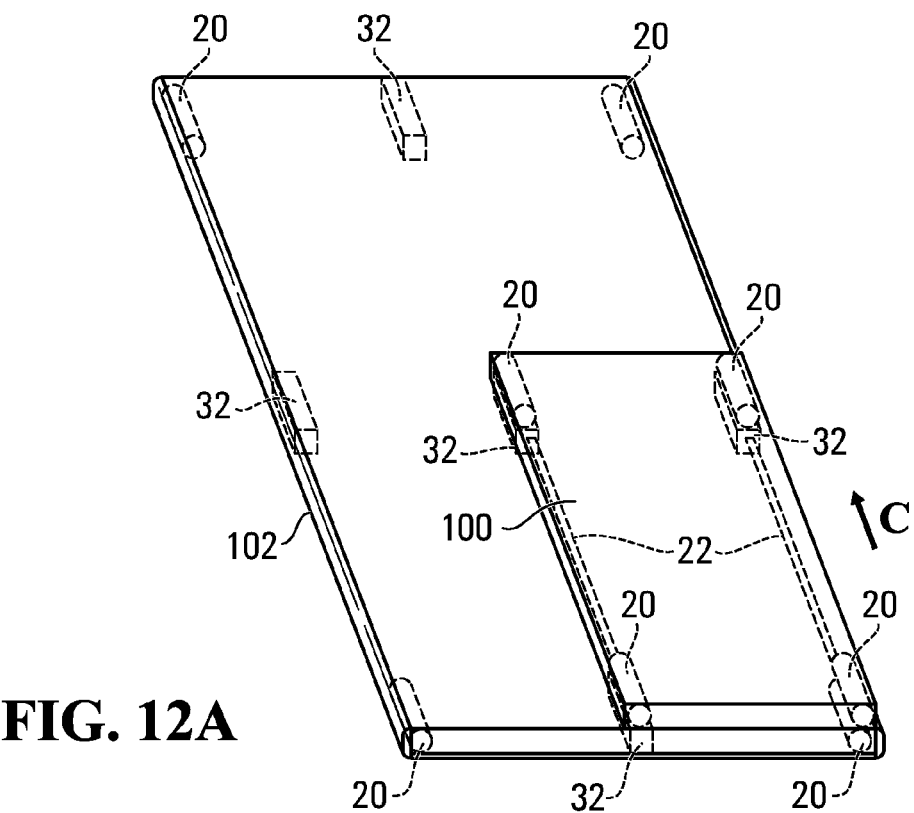
FIG. 12A is a perspective view of an electronic device interconnected with a second electronic device in a first configuration, exemplary of an embodiment.
Figure 12B:
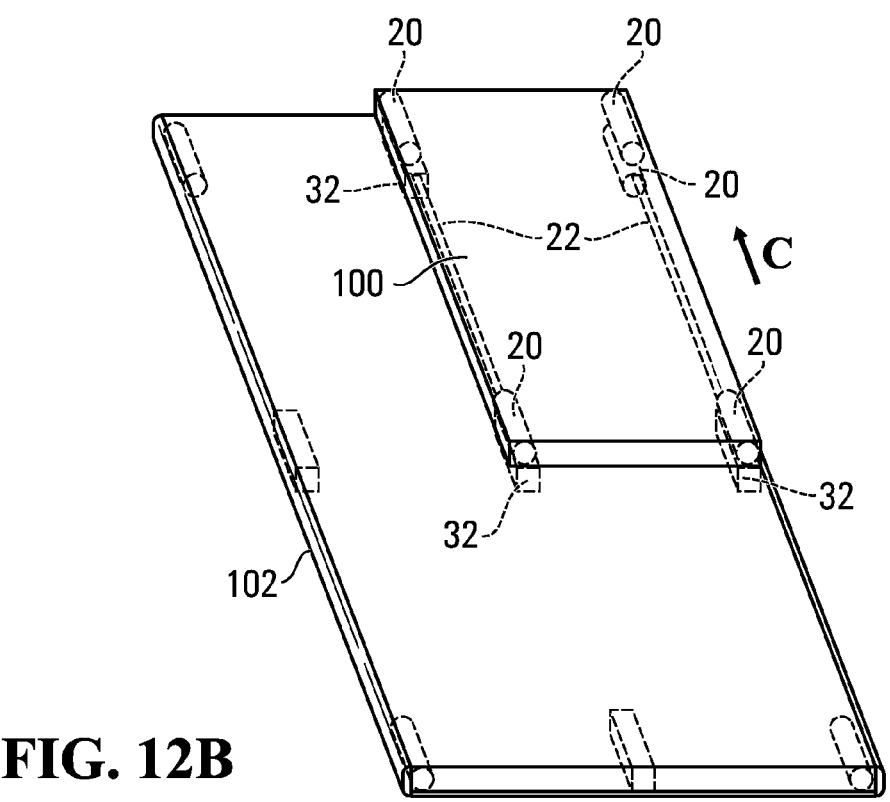
FIG. 12B is a perspective view of the electronic device of FIG. 12A interconnected with the second electronic device of FIG. 12A in a second configuration, following movement in direction C, exemplary of an embodiment.

An alternative interconnection between an electronic device 100 and a second electronic device 102 using magnetic pads 32 is illustrated in FIGS. 12A and 12B. FIG. 12A is a perspective view of electronic device 100 interconnected with second electronic device 102 in a first position, exemplary of an embodiment. FIG. 12B is a perspective view of the electronic device 100 of FIG. 12A interconnected with the second electronic device 102 of FIG. 12A in a second position, following movement in direction of arrow C, exemplary of an embodiment.

Magnetic guide rails 22 in electronic device 100 guide movement of electronic device 100, based on a magnetic attraction from connectors 20 and magnetic pads 32 in second electronic device 102, from a position as shown in FIG. 12A, to a pre-defined position shown in FIG. 12B.

In some embodiments, magnetic pads 32 may be permanent magnets. In embodiments where magnetic pads 32 are permanent magnets, and hence produce their own magnetic field, the magnetic pads 32 may also serve to draw connectors 20 into proper position and alignment when in proximity.

In some embodiments, magnetic guide rails 22 may be formed of a permanent magnet, for example, a ferromagnetic material that has been magnetized such that the applied magnetic field persists as a permanent magnet after removal of an applied magnetic field. Permanent magnets may be made of a suitable rare earth magnet, for example, Neodymium-Iron-Boron, or Samarium-cobalt. Example embodiments of magnetic guide rails as permanent magnets are illustrated in FIGS. 13A, 13B, 13C and 13D.

Figure 13A:
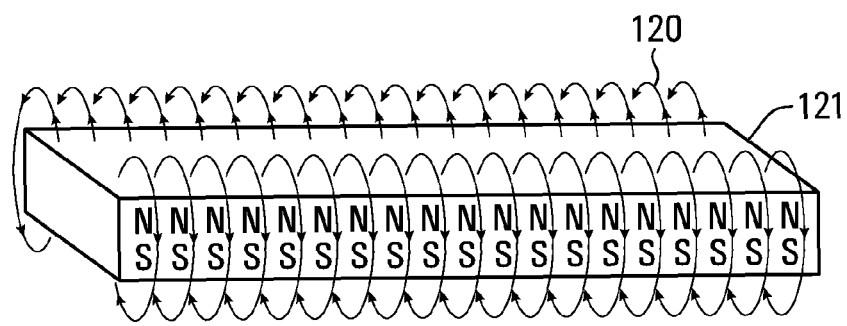
FIGS. 13A, 13B, 13C and 13D are perspective views of magnetic field lines of magnetic guide rails, exemplary of embodiments.

In an embodiment illustrated in FIG. 13A, where magnetic guide rails are permanent magnets, magnetic field lines 120 of each magnetic guide rail 121 is oriented perpendicular to the lengthwise extend of magnetic guide rail 121, and as such, if in an embodiment magnetic guide rail 121 is implemented in a device such as electronic device 10, field lines 120 would be perpendicular to external surface 16 of electronic device 10.

As a permanent magnet, magnetic guide rail 121 itself exerts a magnetic field which can interact to attract or repel the permanent magnet in a connector 20, for example, in an electronic device 10, depending on the orientation of the magnetic poles in the permanent magnet of connector 20 and the orientation of the magnetic fields 120 of magnetic guide rail 121.

Figure 13B:
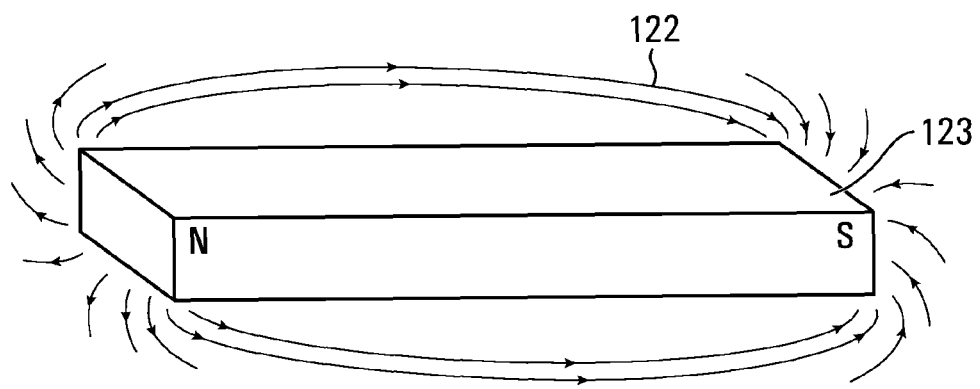

In alternative embodiments of magnetic rails as permanent magnets, the magnetic poles of magnetic guide rail 123 may be oriented in-line and parallel to the extent of magnetic guide rail 123 as illustrated by magnetic field lines 122 in FIG. 13B. In this configuration, magnetic guide rails 123 exert a magnetic force generally tangent to the lengthwise extent of magnetic guide rails 123, in attraction to a connector 20 if it presents an opposing magnetic pole, and repelling a like magnetic pole.

Figure 14A:
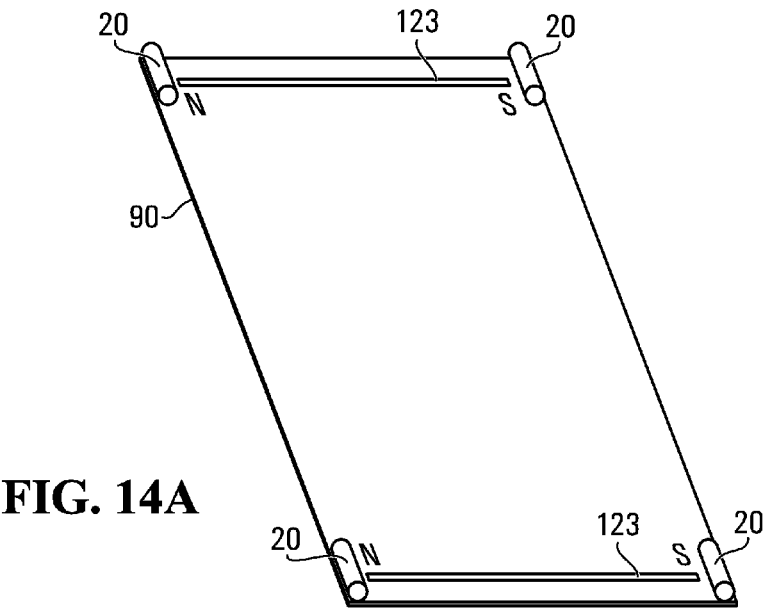
FIG. 14A is a partial perspective view showing locations of magnetic guide rails and magnetic poles of the magnetic guide rails on an electronic device, exemplary of an embodiment.
Figure 14B:
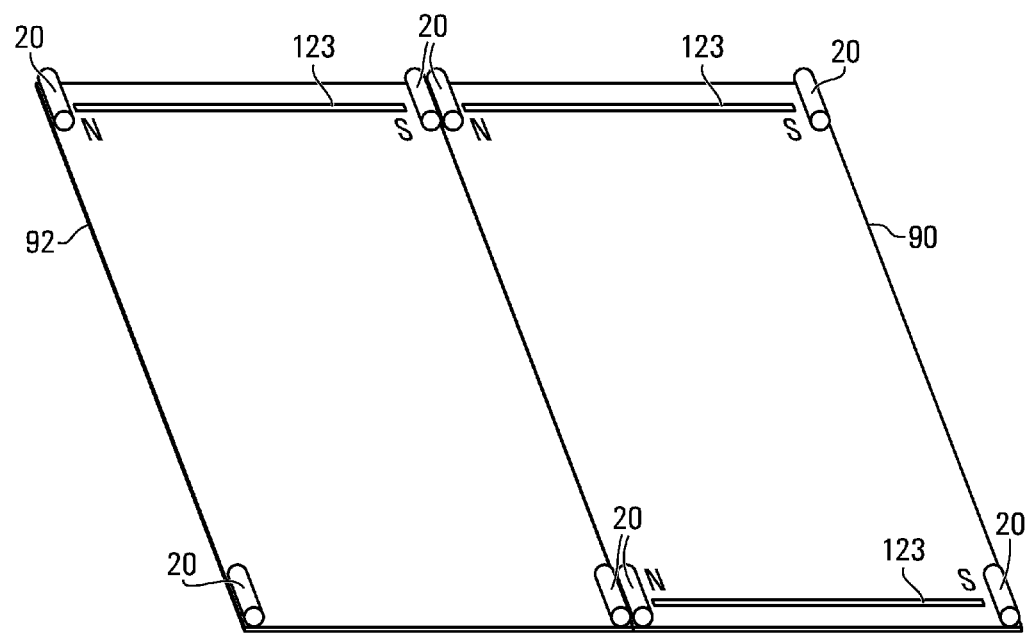
FIG. 14B is a partial perspective view of the electronic device of FIG. 14A interconnected with a second electronic device, exemplary of an embodiment.

An embodiment in which magnetic guide rails 123 have a magnetic field parallel to external surface of an electronic device as in FIG. 13A can be seen in a top view of FIG. 14A. FIG. 14A is a partial perspective view showing locations of rails on an electronic device 90, exemplary of an embodiment. Electronic device 90 includes magnetic guide rails 123, that have the magnetic field 122 as shown in FIG. 13A. FIG. 14B is a partial perspective view of electronic device 90 of FIG. 14A interconnected with a second electronic device 92 which includes connectors 20 proximate its corners. A connector 20 in second electronic device 92, when aligned at the mid-way point of a magnetic guide rail 123, will be attracted to the magnetic pole at the end-point of magnetic guide rail 123 in which direction it is first urged. Once connector 20 of second electronic device 92 is in position at an end of magnetic guide rail 123, it is inclined to stay there, since connector 20 is attracted to one end of magnetic guide rail 123, and repelled from the other end of magnetic guide rail 123. From there, connector 20 in second electronic device 92 may easily form a magnetic and/or electrical connection with connector 20 in electronic device 90, as shown in FIG. 14B.

Figure 13C:
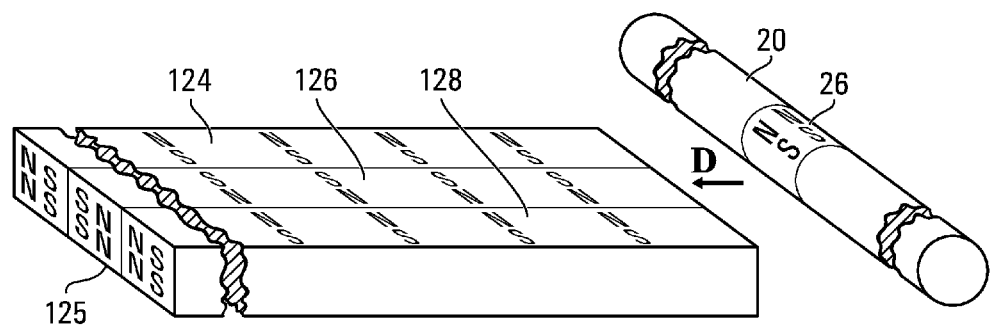

In embodiments where the magnetic guide rail is a permanent magnet, the magnetic guide rail may be formed to have more complex magnetic field patterns. As shown in FIG. 13C, magnetic guide rail 125 may be divided into magnetic domains 124, 126, 128, each extending the length of the magnetic guide rail 125, namely top domain 124, middle domain 126 and bottom domain 128. Middle domain 126 may have an orientation of its magnetic poles opposite top domain 124 and bottom domain 128.

In such an embodiment, connector 20 of electronic device 10, also shown in FIG. 13C, having a permanent magnet 26 sized and aligned complementary to middle domain 126, with an orientation of its magnetic poles opposite middle domain 126 (and the same as the top domain 124 and bottom domain 128). As such, permanent magnet 26 in connector 20 will be magnetically attracted to middle domain 126 but repelled from top domain 124 and bottom domain 128 as connector 20 moves relative to magnetic guide rail 125 in the direction of arrow D. This may allow for more precise alignment of connector 20 relative to magnetic guide rail 22.

Figure 13D:
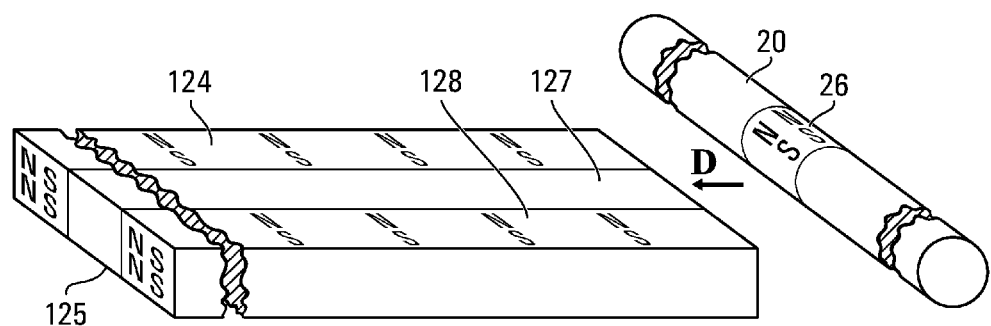

Alternatively, middle domain 126 region may be replaced with a ferromagnetic region, as shown in FIG. 13D. Magnetic guide rail 129 may be divided into magnetic domains 124, 127, 128, each extending the length of the magnetic guide rail 125, namely top domain 124, middle domain 127 and bottom domain 128. Middle domain 127 may be an unmagnetized ferromagnetic material, which may be attracted to permanent magnet 26 in connector 20 when permanent magnet 26 is sized and aligned complementary to middle domain 127. Top domain 124 and bottom domain 128 provide an alignment function when connector 20 moves relative to magnetic guide rail 127 in the direction of arrow D, in a similar manner as in the embodiment of magnetic rail guide 125 shown in FIG. 13C.

In another embodiment, not shown, middle domain 127 could be non-magnetic, namely, not formed from a ferromagnetic material. In this case, there would be no attraction between permanent magnet 26 in connector 20 and middle region 127, but top domain 124 and bottom domain 128 still provide an alignment function for connector 20.

In some embodiments, magnetic guide rails formed of permanent magnet, such as magnetic guide rails 121, 123, 125 or 129 can be used to create "no-go zones", in which the magnetic field of said magnetic guide rails repels the same pole of a connector 20, resisting an electronic device 10 from being urged towards a configuration.

In additional alternative embodiments, magnetic guide rails 22 may be formed of electromagnets, in which a magnetic field in magnetic guide rails 22 is produced by an electric current.

Figure 15A:
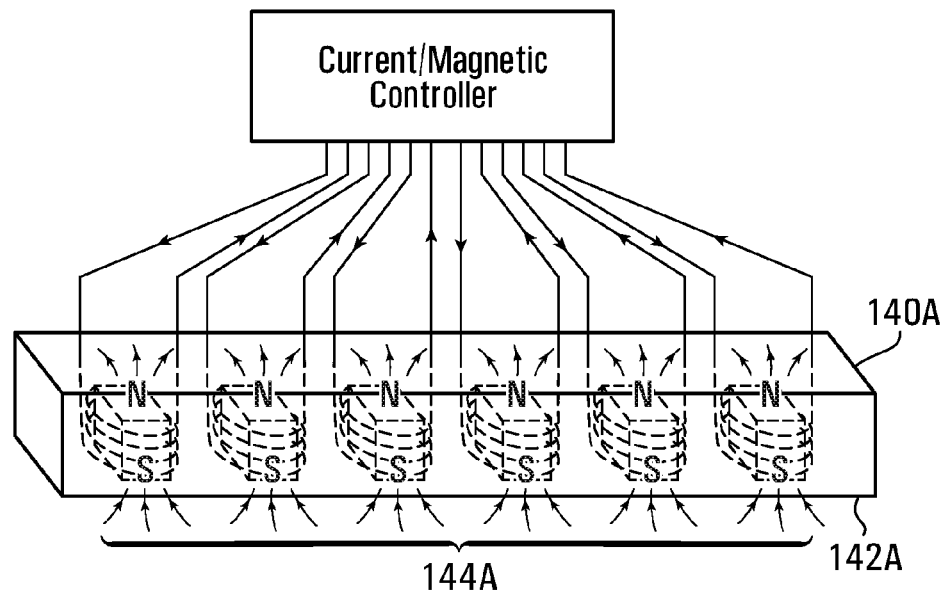
FIGS. 15A and 15B are perspective views of magnetic field lines of electromagnetic guide rails, exemplary of embodiments.
Figure 15B:
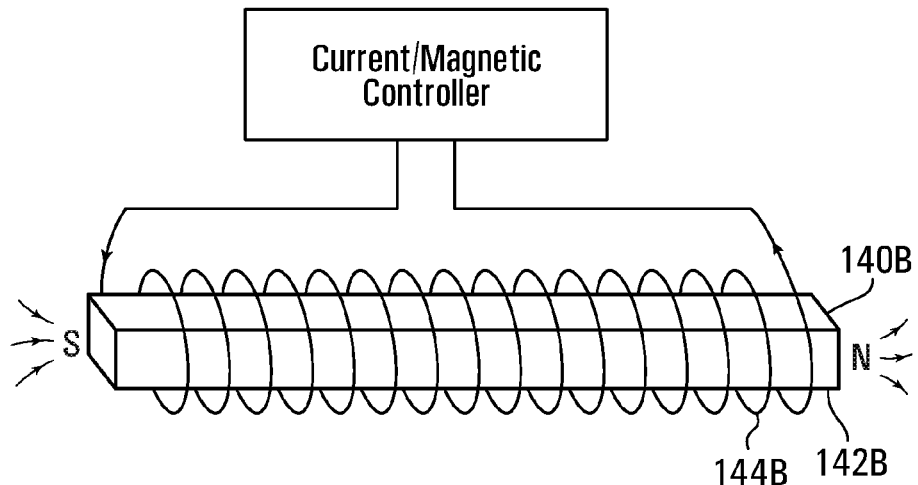

FIGS. 15A, 15B illustrate embodiments in which magnetic guide rails may be electromagnetic. FIG. 15A illustrates an embodiment of electromagnetic guide rail 140A, in which the several coils about axes perpendicular to the lengthwise extent of conductor 142A may be formed. Each coil may, for example, be embedded within a cavity of conductor 142A, so as to produce a magnetic field tangential to its central axes, similar to the magnetic field lines 120 of FIG. 13A.

In an alternative embodiment of an electromagnetic guide rail as shown in FIG. 15B, electromagnetic guide rail 140B includes a magnetic core 142B, that may be made from a ferromagnetic material such as iron or steel, and a number of wire turns 144B along the lengthwise extent of coil 140B, through which electric current flows. The flow of electric current through the wire produces a magnetic field, for example, similar to magnetic field 122 shown in FIG. 13B.

As will be appreciated, the direction of the magnetic field in the embodiments illustrated in FIGS. 15A and 15B can be altered by changing the direction of current through coils 144A, 144B.

As will be appreciated, electromagnetic guide rails 140A, 140B may also be selectively activated, by energizing or de-energizing coils 144A or 144B, by way of a suitable controller. For example, a prohibited configuration (e.g. a "no-go zone") could be selectively enable or disabled with entry of a password. A "no-go zone" could be enabled by certain sections of devices such as devices 10, 12 being enabled with the same magnetic polarity such that they repel each other.

In alternative embodiments, magnetic guide rails 22 can be placed in other devices such as other electronic devices, appliances, vehicle dashboards and walls, to name a few. Such other devices may or may not include connectors 20 or magnetic pads 32.

Additionally, while magnetic guide rails have primarily been illustrated as being present in electronic device 10, each interconnected device (e.g. second electronic device 12 and electronic device 10) may include its own set of magnetic guide rails, for example, magnetic guide rails 22 that may engage connectors 20 on the other interconnected device 10 or device 12. In such embodiments, the roles of device 10 and device 12 may be reversed, with connectors 20 in electronic device 10 engaging rails of second electronic device 12. Similarly, if magnetic guide rails are present in each interconnected device (e.g. second electronic device 12 and electronic device 10), the magnetic guide rails in each device may engage each other in an embodiment where one or more of the magnetic guide rails is exerting a magnetic field.

Further, while the interaction of two devices 10, 12 has been exemplified, the connectors 20 of second electronic device 12 may be used to guide several devices (e.g. second, third, fourth, devices etc.) on surface 16.

While surface 16 of a device 10, 12 has been described as being a flat, planar surface, as will be appreciated, a surface 16 upon which another device is magnetically guided by magnetic guide rails may be curved, for example, convex or concave.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. An electronic device that may be interconnected to a second electronic device in a configuration in which said second electronic device is located at a pre-defined position relative to said electronic device, said electronic device comprising:
    a plurality of magnetic guide rails proximate a surface of said electronic device, each of said plurality of magnetic guide rails formed of unmagnetized ferromagnetic material;
    wherein said plurality of magnetic guide rails interact with at least one magnetized magnetic element on said second electronic device to magnetically guide relative movement of said electronic device and said second electronic device to position said electronic device and said second electronic device in said configuration as at least one of said electronic device and said second electronic device is urged along a surface of said electronic device toward said pre-defined position.

2. The electronic device of claim 1, wherein said at least one magnetized magnetic element of said second electronic device comprises an electrical connector.

3. The electronic device of claim 2, wherein said electrical connector of said second electronic device is a physical connector of a serial port of said second electronic device.

4. The electronic device of claim 3, wherein said serial port is a Universal Serial Bus (USB) port.

5. The electronic device of claim 2, wherein said pre-defined position has an electrical connector of said electronic device interconnected with said electrical connector of said second electronic device.

6. The electronic device of claim 1, wherein at least one of said plurality of magnetic guide rails has a cross-section that is at least one of rectangular, tapered or generally round.

7. The electronic device of claim 1, further comprising at least one magnetic pad providing a magnetic anchor point along at least one of said plurality of magnetic guide rails.

8. The electronic device of claim 7, wherein said at least one magnetic pad is formed of at least one of unmagnetized ferromagnetic materials and a permanent magnet.

9. The electronic device of claim 1, wherein said plurality of magnetic guide rails magnetically guide relative movement of said electronic device and said second electronic device when said electronic device is in physical contact with said second electronic device.

10. The electronic device of claim 1, wherein said plurality of magnetic guide rails magnetically guide relative movement of said electronic device and said second electronic device along a two-dimensional path as at least one of said electronic device and said second electronic device is urged along said surface of said electronic device.

11. The electronic device of claim 1, wherein at least one of said plurality of magnetic guide rails magnetically guide relative movement of said electronic device and said second electronic device by exerting a magnetic field on said at least one magnetized magnetic element of said second electronic device.

12. The electronic device of claim 11, wherein said magnetic field is produced tangential to a length of said at least one magnetic guide rail.

13. The electronic device of claim 11, wherein said magnetic field resists motion of said second electronic device away from said pre-defined position.

14. The electronic device of claim 11, wherein said at least one magnetic guide rail is formed of a permanent magnet.

15. The electronic device of claim 11, wherein said at least one magnetic guide rail is electromagnetic.

16. The electronic device of claim 15, further comprising a controller to selectively energize said at least one magnetic guide rail.

17. The electronic device of claim 11, wherein said magnetic field repels said at least one magnetized magnetic element of said second electronic device.

18. A method of operating electronic devices, comprising:
    providing a first electronic device including a plurality of magnetic guide rails proximate a surface of said first electronic device, said plurality of magnetic guide rails formed of unmagnetized ferromagnetic material; and
    urging at least one of said first electronic device and a second electronic device along a surface of said first electronic device toward a configuration in which said second electronic device is located at a pre-defined interconnected position relative to said first electronic device, as said plurality of magnetic guide rails interact with at least one magnetized element on said second electronic device to magnetically guide relative movement of said first electronic device and said second electronic device toward said configuration.

19. The method of operating electronic devices of claim 18, further comprising:
    urging a third electronic device, comprising a plurality of additional magnetic guide rails, on a surface of said second electronic device toward a second configuration in which said third electronic device is located at a second pre-defined interconnected position relative to said second electronic device, as said plurality of additional magnetic guide rails interact with at least one magnetic element on said second electronic device to magnetically guide relative movement of said second electronic device and said third electronic device toward said second configuration.

20. An electronic device that may be interconnected to a second electronic device in a configuration in which said second electronic device is located at a pre-defined position relative to said electronic device, said electronic device comprising:
    a plurality of magnetic guide rails proximate a surface of said electronic device;
    wherein said plurality of magnetic guide rails interact with at least one magnetic element on said second electronic device to magnetically guide relative movement of said electronic device and said second electronic device to position said electronic device and said second electronic device in said configuration as at least one of said electronic device and said second electronic device is urged along a surface of said electronic device toward said pre-defined position;

wherein said at least one magnetic element of said second electronic device comprises an electrical connector; and wherein said pre-defined position has an electrical connector of said electronic device interconnected with said electrical connector of said second electronic device.

21. A method of operating electronic devices, comprising:

providing a first electronic device including a plurality of magnetic guide rails proximate a surface of said first electronic device;

urging at least one of said first electronic device and a second electronic device along a surface of said first electronic device toward a configuration in which said second electronic device is located at a second pre-defined interconnected position relative to said first electronic device, as said plurality of magnetic guide rails interact with at least one magnetic element on said second electronic device to magnetically guide relative movement of said first electronic device and said second electronic device toward said configuration; and urging a third electronic device, comprising a plurality of additional magnetic guide rails, on said surface of said second electronic device toward a second configuration in which said third electronic device is located at a pre-defined interconnected position relative to said second electronic device, as said plurality of additional magnetic guide rails interact with at least one magnetic element on said second electronic device to magnetically guide relative movement of said second electronic device and said third electronic device toward said second configuration.

* * * * *